(12) United States Patent
Yang et al.

(10) Patent No.: US 11,296,831 B2
(45) Date of Patent: Apr. 5, 2022

(54) METHOD AND APPARATUS FOR WIRELESS COMMUNICATION

(71) Applicant: GUANGDONG OPPO MOBILE TELECOMMUNICATIONS CORP., LTD., Guangdong (CN)

(72) Inventors: Ning Yang, Guangdong (CN); Jianhua Liu, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 40 days.

(21) Appl. No.: 16/656,128

(22) Filed: Oct. 17, 2019

(65) Prior Publication Data

US 2020/0052833 A1 Feb. 13, 2020

Related U.S. Application Data

(63) Continuation of application No. PCT/CN2017/082507, filed on Apr. 28, 2017.

(51) Int. Cl.
*H04L 1/00* (2006.01)
*H04L 1/18* (2006.01)
(Continued)

(52) U.S. Cl.
CPC .......... *H04L 1/1848* (2013.01); *H04L 1/0091* (2013.01); *H04W 24/02* (2013.01);
(Continued)

(58) Field of Classification Search
CPC ............... H04W 28/06; H04W 28/065; H04W 28/0252; H04W 28/0263; H04W 28/0242;
(Continued)

(56) References Cited

U.S. PATENT DOCUMENTS

2011/0051664 A1 3/2011 Kim et al.
2014/0105112 A1* 4/2014 Chun ...................... H04L 47/30
370/328

(Continued)

FOREIGN PATENT DOCUMENTS

CN 1852581 10/2006
CN 103428484 12/2013
(Continued)

OTHER PUBLICATIONS

WIPO, ISR for PCT/CN2017/082507, Jan. 12, 2018.
(Continued)

*Primary Examiner* — Jae Y Lee
*Assistant Examiner* — Aixa A Guadalupe Cruz
(74) *Attorney, Agent, or Firm* — Hodgson Russ LLP

(57) ABSTRACT

Disclosed in embodiments of the present disclosure are a method and apparatus for wireless communication. The method comprises: a receiving end determines that at least one protocol data unit (PDU) is not received between a first PDU and a second PDU; the receiving end determines a target time length of a timer according to the data type of the at least one PDU; the receiving end starts the timer and waits for the at least one PDU within the target time length. The method and apparatus in the embodiments of the present disclosure are favorable for improving the flexibility of wireless communication.

15 Claims, 5 Drawing Sheets

100

| Receiving End Determines That At Least One Protocol Data Unit PDU Is Not Received Between First PDU and Second PDU | ~110 |

| Receiving End Determines Target Duration of Timer Based on Data Type of At Least One PDU | ~120 |

| Receiving End Starts Timer and Waits for Each PDU of At Least One PDU Within Target Duration | ~130 |

(51) Int. Cl.
*H04W 24/02* (2009.01)
*H04L 1/16* (2006.01)

(52) U.S. Cl.
CPC .......... *H04L 1/0078* (2013.01); *H04L 1/1642* (2013.01); *H04L 1/1812* (2013.01); *H04L 1/1829* (2013.01)

(58) Field of Classification Search
CPC ...... H04W 28/26; H04L 47/34; H04L 1/1841; H04L 1/1848; H04L 1/1825; H04L 1/1851
See application file for complete search history.

(56) References Cited

U.S. PATENT DOCUMENTS

| | | | |
|---|---|---|---|
| 2016/0219458 A1* | 7/2016 | Kubota | H04W 28/0273 |
| 2017/0041102 A1 | 2/2017 | Lu et al. | |
| 2017/0041767 A1* | 2/2017 | Vajapeyam | H04W 4/06 |
| 2019/0320416 A1* | 10/2019 | Han | H04W 72/02 |
| 2020/0068652 A1* | 2/2020 | Xu | H04L 1/1642 |
| 2020/0382431 A1* | 12/2020 | Decarreau | H04L 1/187 |

FOREIGN PATENT DOCUMENTS

| | | |
|---|---|---|
| EP | 2086150 | 8/2009 |
| JP | 2010536234 | 11/2010 |
| WO | 2011028028 | 3/2011 |
| WO | 2011028928 | 3/2011 |
| WO | 2013174036 | 11/2013 |

OTHER PUBLICATIONS

European Patent Office, Search Report for EP Application No. 17906861.4, dated Mar. 25, 2020.
EPO, Office Action for EP Application No. 17906861.4, dated Jun. 25, 2020.
CMCC et al., "New Work Item on Voice and Video enhancement for LTE," 3GPP TSG RAN Meeting #73, RP-161856, revision of RP-161815, Sep. 2016, 8 pages.
KIPO, Office Action for KR Application No. 10-2019-7032709, dated May 14, 2021.
CMCC et al., "New WID on Further enhancements on Video for LTE," 3GPP TSG RAN Meeting #75, RP-170781, Mar. 2017, 4 pages.
"3rd Generation Partnership Project; Technical Specification Group Radio Access Network; Evolved Universal Terrestrial Radio Access (E-UTRA); Radio Link Control (RLC) protocol specification (Release 14)," 3GPP TS 36.322, Mar. 2017, v14.0.0, 45 pages.
IPI, Office Action for IN Application No. 201917044484, dated Feb. 17, 2021.
JPO, Office Action for JP Application No. 2019-556368, dated Mar. 5, 2021.

* cited by examiner

| 1 | 2 | 3 | 4 | 5 | 6 | 7 | 8 | 9 | 10 |
|---|---|---|---|---|---|---|---|---|----|
| I | P | P | P | I | P | P | P | I | P |
| 0 | 1 | 2 | 3 | 4 | 1 | 2 | 3 | 4 | 1 |

↑                                    ↑

VR(UR)                            VR(UX)

| 1 | 2 | 3 | 4 | 5 |
|---|---|---|---|---|
| I | P | P | P | P |
| 0 | 1 | 2 | 3 | 4 |

↑                                    ↑

VR(UR)                      VR(UX)

METHOD AND APPARATUS FOR WIRELESS COMMUNICATION

CROSS-REFERENCE TO RELATED APPLICATIONS

This application is a Continuation of International Application No. PCT/CN2017/082507, filed Apr. 28, 2017, the entire disclosure of which is incorporated herein by reference.

TECHNICAL FIELD

Embodiments of the present disclosure relate to the field of communication, and more particularly, to a method and an apparatus for wireless communication.

BACKGROUND

In a reordering scenario in the Unacknowledged Mode (UM) of the Long Term Evolution (LTE), the receiving end needs to detect whether the Media Access Control (MAC) has lost a Radio Link Control (RLC) Protocol Data Unit (PDU), and a PDU that has not been received may be waited for within a range of a duration of a reordering timer t_Reordering. The reordering timer in the prior art has single duration, so that the flexibility of wireless communication is relatively low.

SUMMARY

In view of this, embodiments of the present disclosure provide a method and an apparatus for wireless communication.

In a first aspect, a method for wireless communication is provided, the method comprising: determining, by a receiving end, that at least one Protocol Data Unit PDU is not received between a first PDU and a second PDU; determining, by the receiving end, a target duration of a timer based on a data type of the at least one PDU; starting, by the receiving end, the timer and waiting for each PDU of the at least one PDU within the target duration.

In a second aspect, a method for wireless communication is provided, comprising: determining, by a receiving end, that a plurality of PDUs of multiple data types are not received between a first protocol data unit PDU and a second PDU; determining, by the receiving end, duration of a plurality of timers which are in one-to-one correspondence with the multiple data types based on the multiple data types; starting simultaneously, by the receiving end, the plurality of timers and waiting for the plurality of PDUs within the duration of the plurality of timers.

In a third aspect, a method for wireless communication is provided, comprising: sending, by a sending end, a plurality of data protocol units PDUs to a receiving end, wherein each PDU of the plurality of PDUs comprises an indicator field, wherein the indicator field indicates a location of a PDU whose data type is different from that of a present PDU, wherein the PDU whose data type is different from that of a present PDU is a PDU which is sent before the present PDU and whose serial number is the closest to that of the present PDU, so that the receiving end determines a data type of at least one PDU which is not received, wherein the plurality of PDUs comprises the at least one PDU.

In a fourth aspect, an apparatus is provided, which is used for performing the above methods in the first aspect or any possible implementations thereof. Specifically, the apparatus includes units for performing the above methods in the first aspect or any possible implementations thereof.

In a fifth aspect, an apparatus is provided, which is used for performing the above methods in the second aspect or any possible implementations thereof. Specifically, the apparatus includes units for performing the above methods in the second aspect or any possible implementations thereof.

In a sixth aspect, an apparatus is provided, which is used for performing the above methods in the third aspect or any possible implementations thereof. Specifically, the apparatus includes units for performing the above methods in the third aspect or any possible implementations thereof.

In a seventh aspect, an apparatus is provided, which includes a memory, a processor, an input interface and an output interface. The memory, the processor, the input interface and the output interface are connected to a bus system. The memory is used to store instructions, and the processor is used to execute instructions stored in the memory and to perform the above methods in the first aspect or any possible implementations thereof.

In an eighth aspect, an apparatus is provided, which includes a memory, a processor, an input interface and an output interface. The memory, the processor, the input interface and the output interface are connected to a bus system. The memory is used to store instructions, and the processor is used to execute instructions stored in the memory and to perform the above methods in the second aspect or any possible implementations thereof.

In a ninth aspect, an apparatus is provided, which includes a memory, a processor, an input interface and an output interface. The memory, the processor, the input interface and the output interface are connected to a bus system. The memory is used to store instructions, and the processor is used to execute instructions stored in the memory and to perform the above methods in the third aspect or any possible implementations thereof.

In a tenth aspect, a computer storage medium is provided for storing computer software instructions used to perform the above methods in the first aspect or any possible implementations thereof, the above methods in the second aspect or any possible implementations thereof, or the above methods in the third aspect or any possible implementations thereof, including programs designed to perform the above aspects.

These and other aspects of the present disclosure will be apparent in the following description of the embodiments.

DETAILED DESCRIPTION

Figure 1:
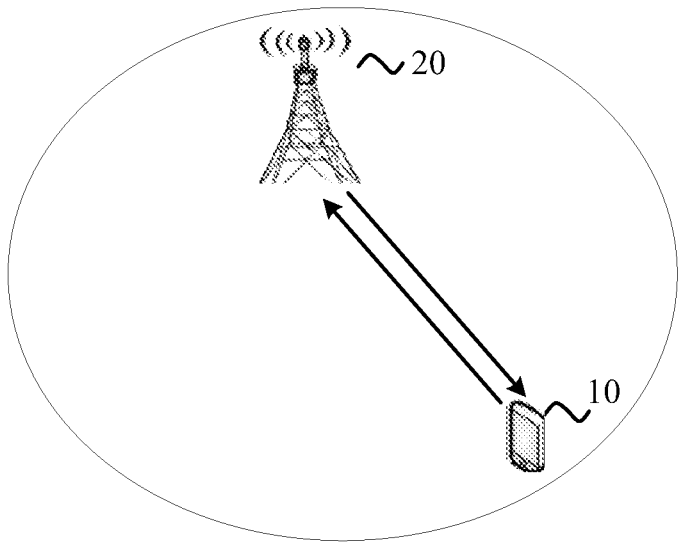
FIG. 1 is a schematic diagram of an application scenario in an embodiment of the present disclosure.

The technical solutions in the embodiments of the present disclosure will be clearly and completely described in the following with reference to drawings of the embodiments of the present disclosure.

It should be understood that technical solutions of embodiments of the present disclosure may be applied in various kinds of communication systems such as the Global System of Mobile (GSM) communication system, the Code Division Multiple Access (CDMA) system, the Wideband Code Division Multiple Access (WCDMA) system, the General Packet Radio Service (GPRS), the Long Term Evolution (LTE) system, the LTE Frequency Division Duplex (FDD) system, the LTE Time Division Duplex (TDD), the Universal Mobile Telecommunication System (UMTS), the Worldwide Interoperability for Microwave Access (WiMAX) communication system or a future 5G system.

In particular, the technical solutions of the embodiments of the present disclosure may be applied to various communication systems based on non-orthogonal multiple access technology, such as the Sparse Code Multiple Access (SCMA) system, and the Low Density Signature (LDS) system. Certainly, the SCMA system and the LDS system may also be called as other names in the field of communication; further, the technical solutions of the embodiments of the present disclosure may be applied to the multi-carrier transmission system based on non-orthogonal multiple access technology, such as the Orthogonal Frequency Division Multiplexing (OFDM), the Filter Bank Multi-Carrier (FBMC), the Generalized Frequency Division Multiplexing (GFDM), and the Filtered-OFDM (F-OFDM) system.

The terminal device in the embodiments of the present disclosure may refer to a User Equipment (UE), an access terminal, a user unit, a user station, a mobile station, a mobile platform, a remote station, a remote terminal, a mobile device, a user terminal, a terminal, a wireless communication equipment, a user agent or a user device. An access terminal may be a cell phone, a cordless phone, an Session Initiation Protocol (SIP) phone, a Wireless Local Loop (WLL) station, a Personal Digital Assistant (PDA), a hand-held device with a wireless communication function, a computing device or another processing device connected to a wireless modem, a vehicle-mounted device, a wearable device, a terminal device in a future 5G network, a terminal device in a future evolved Public Land Mobile Network (PLMN), or the like. The embodiments of the present disclosure are not limited to this.

The network device in the embodiments of the present disclosure may be a device used to communicate with the terminal device, wherein the network device may be a Base Transceiver Station (BTS) in GSM or CDMA, an NodeB (NB) in a WCDMA system, an Evolutional Node B (eNB or eNodeB) in an LTE system, or a wireless controller in a scenario of Cloud Radio Access Network (CRAN). Alternatively, the network device may be a relay station, an access point, a vehicle-mounted device, a wearable device, a network device in a future 5G network, a network device in a future evolved Public Land Mobile Network (PLMN), or the like. The embodiments of the present disclosure are not limited to this.

FIG. 1 is a schematic diagram of a disclosure scenario in an embodiment of the present disclosure. The communication system in FIG. 1 may include a terminal device 10 and a network device 20. The network device 20 is used to provide communication services for the terminal device 10 and access the core network. The terminal device 10 accesses the network by searching for synchronous signals, broadcast signals and etc. transmitted by the network device 20, so as to communicate with the network. The arrow shown in FIG. 1 may represent uplink/downlink transmission via a cellular link between the terminal device 10 and the network device 20.

The Radio Link Control (RLC) layer is located between a Packet Data Convergence Protocol (PDCP) layer and a Media Access Control (MAC) layer. It communicates with a PDCP layer through a Service Access Point (SAP) and communicates with the MAC layer through a logical channel. There is one RLC entity per logical channel per UE. Data received by the RLC entity from the PDCP layer or data sent to the PDCP layer are called as an RLC SDU. Data received by the RLC entity from the MAC layer, or data sent to the MAC layer are called as an RLC PDU.

The embodiments of the present disclosure are based on a reordering scenario in the Unacknowledged Mode (UM) of LTE. For convenience of description, this scenario will be briefly described below with reference to FIG. 2.

A UM entity mainly does several things at the receiving end: (1) reassembling the segmented RLC SDU to recover the original RLC SDU and sending it to the PDCP layer; (2) reordering the RLC PDU; (3) detecting and discarding duplicate packets.

If the RLC PDUs received by the receiving end are out of order, reordering is required first. Since the MAC layer uses a plurality of Hybrid Automatic Repeat reQuest (HARQ) processes to process HARQ, out-of-order arrival is inevitable. The out-of-order RLC PDUs are first stored in a receiving buffer until all the previous RLC PDUs have been successfully received and delivered to the PDCP layer.

The receiving end needs to detect whether the MAC layer has lost a RLC PDU and avoid excessive reordering delay. To put it simply, the receiving end only waits for the RLC PDU that has not been received for a while, and the receiving end won't wait if the RLC PDU that has not been received. The reordering timer t_Reordering determines how long it takes to wait for a PDU that has not yet been received. There is only one t_Reordering per UM entity. The purpose of using this timer is to detect whether a RLC PDU is lost in the MAC layer. If this PDU is not received within the time specified by the t_Reordering, the receiving end considers that this PDU is lost, and the UM entity will not try again to receive these lost PDUs.

Figure 2:
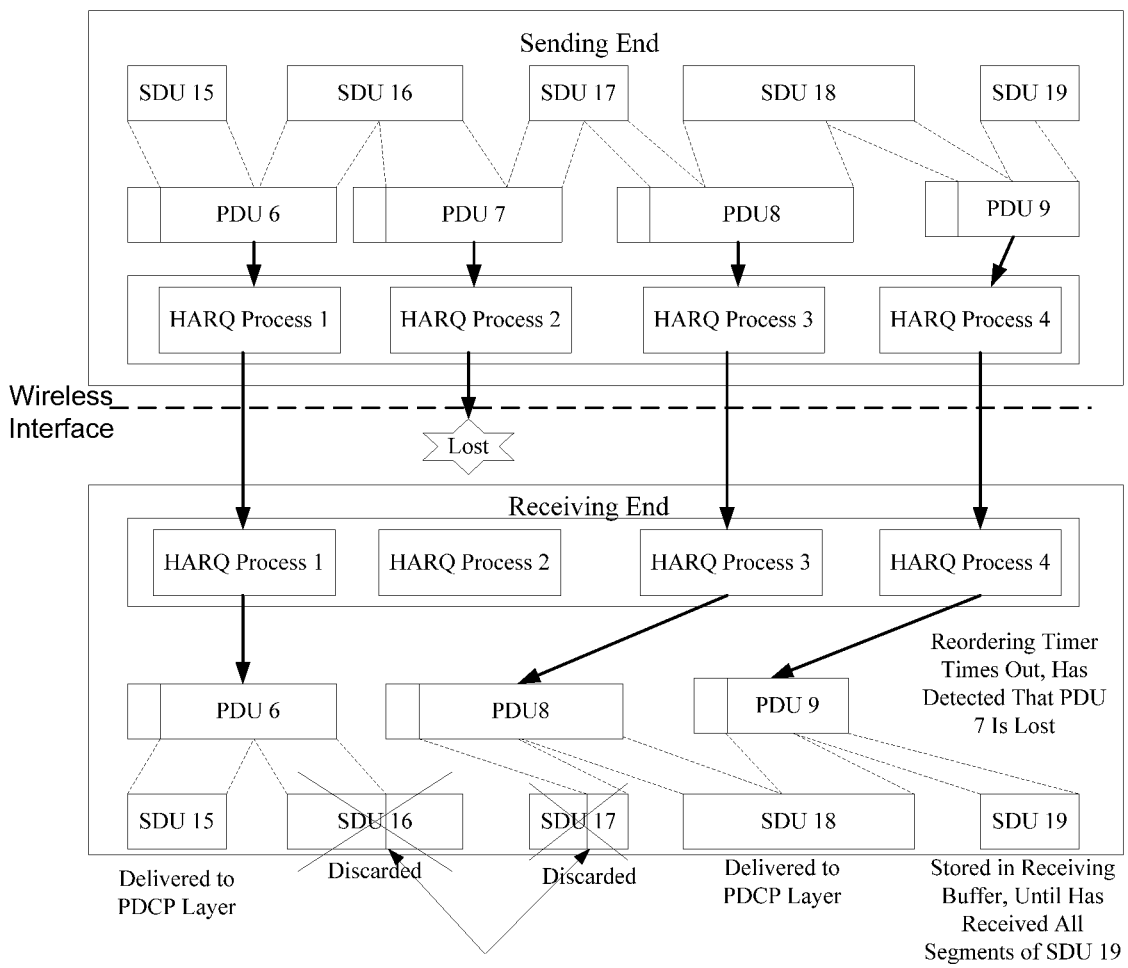
FIG. 2 is a schematic diagram of a specific scenario in an embodiment of the present disclosure.

As shown in FIG. 2, the HARQ process of the MAC layer causes the RLC PDUs to arrive at the RLC layer of the receiving end in the order of PDU 8, PDU 6, and PDU 9. At this time, the receiving end reorders the received PDUs, and saves the PDUs in the receiving buffer in the order of PDU 6, PDU 8, and PDU 9. When the receiving end receives the PDU 8, the timer t_Reordering will be started. Since PDU 7 has not been received before the timer expires, the receiving end considers that the PDU 7 is lost. When the receiving end reassembles the RLC SDU, part of segments of the SDU 16 and the SDU 17 is lost due to the loss of the PDU 7, so that the complete SDU 16 and the SDU 17 cannot be reassembled. Thus, the received segments of the SDU 16 and the SDU 17 will be discarded. The SDU 15 and the SDU 18 are fully received and will be delivered to the PDCP layer. The received segments of SDU 19 will continue to be stored in the receiving buffer until all segments of SDU 19 are received (and eventually may be discarded).

In terms of image processing, three types of frames are defined in a protocol, which respectively are an intraframe (I frame), a forward prediction frame (P frame) or a bi-directional interpolated prediction frame (B frame). The I frame is usually the first frame of each Group of Picture (GOP). After moderate compression, the I frame is used as a reference point for random access and can be used as an image. The I frame can be seen as a compressed product of an image, which can be decompressed into a single complete picture by a video decompression algorithm. The P frame is a coding image which compresses the amount of transmitting data by sufficiently reducing time-redundant information in the previously encoded frame of the image sequence, which is also called as a predictive frame, which needs to refer to an I frame or a B frame in front of itself to generate a complete picture. The B frame is a coding image, which considers the amount of transmitted data, considering both the encoded frame in front of the source picture sequence and the time-redundant information between the encoded frames following the source picture sequence, which is also called as a bi-predictive frame.

In the existing solutions, no matter which type of frame belongs to a same radio bearer, that is, the I frame, the P frame, and/or the B frame are all processed by a same RLC entity, and the reordering mechanism adopted is the same. In view of priorities between different frames, that is, the degree of importance is different, therefore, different reordering mechanisms need to be adopted for different frames.

It should be understood that the above description is based on various frame types, and the technical solutions of the embodiments of the present disclosure is not limited thereto.

Figures 3, 4, 5:
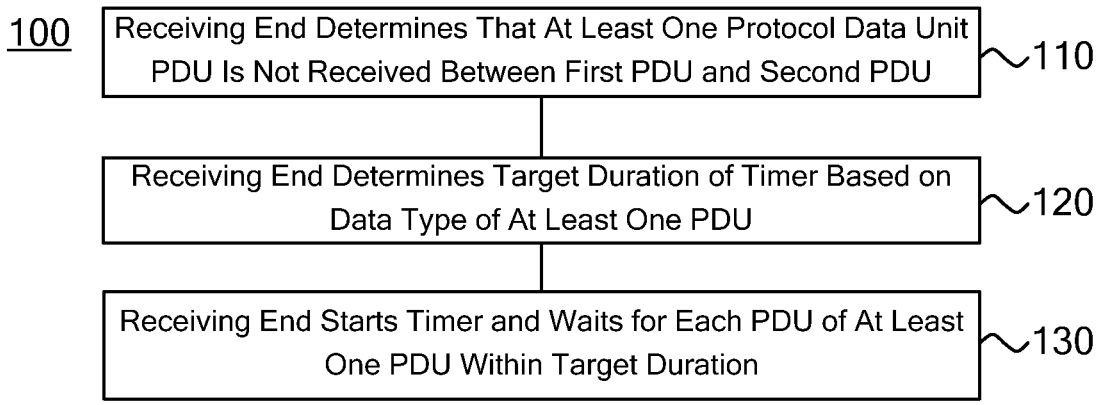
FIG. 3 is a schematic block diagram of a method for wireless communication in an embodiment of the present disclosure.
FIG. 4 is another schematic block diagram of a method for wireless communication in an embodiment of the present disclosure.
FIG. 5 is another schematic block diagram of a method for wireless communication in an embodiment of the present disclosure.

FIG. 3 is a schematic block diagram of a method 100 for wireless communication in an embodiment of the present disclosure. As shown in FIG. 3, the method 100 includes:

S110, a receiving end determines that at least one Protocol Data Unit PDU is not received between a first PDU and a second PDU;

S120, the receiving end determines a target duration of a timer based on a data type of the at least one PDU;

S130, the receiving end starts the timer and waits for each PDU of the at least one PDU within the target duration.

First, the following points need to be explained:

1. The solutions of the embodiments of the present disclosure is applicable to both downlink and uplink. In other words, the receiving end may be a terminal device or a network device.

2. The network device may be configured first with several different duration. Specifically, the network device may configure corresponding duration for different data types. Taking the above frame types as an example, a configuration time of the I frame may be 100 ms and a configuration time of the P frame may be 50 ms. That is, if the I-frame PDU is lost, the I-frame PDU may be waited for within 100 ms. If the P-frame PDU is lost, the P-frame PDU may be waited for within 50 ms.

3. The receiving end may determine whether there is a PDU loss in the middle based on SNs of two adjacent PDUs. Optionally, it is possible to lose one PDU or lose a plurality of PDUs. The two adjacent PDUs may be represented by relevant variables at the receiving end. Specifically, the RLC entity at the receiving end needs to maintain two variables, which may be VR (UR): recording a sequence number of the oldest PDU waiting to be reordered. VR (UX): recording a sequence number of a PDU next to the PDU which triggered the reordering timer. When the timer is started, VR(UR) and VR(UX) may respectively record the upper and lower boundaries within the range of the sequence numbers corresponding to the current timer. That is to say, the PDUs between these two variables are in the process of reordering after the timer ends.

4. The data types of the PDUs proposed in the embodiments of the present disclosure may be the various frame types mentioned above, or may be data of different service types. For example, the importance of the Ultra-Reliable and Low-Latency Communications (URLLC) service may be higher, so the receiving end can configure a timer with a longer duration for data of this service. The enhanced mobile broadband (EMBB) service is relatively common, so the receiving end can configure a timer with a shorter duration for data of this service.

5. It should be understood that, in the embodiments of the present disclosure, determine a target duration of a timer based on a data type of the at least one PDU, which can be that determine a target duration of a timer only based on a data type of part of PDUs in the at least one PDU, which can also be that determine a target duration of a timer based on a data type of all PDUs in the at least one PDU.

6. The receiving end may determine that one or more PDUs are not received based on the discontinuity of sequence numbers between two PDUs. As shown in the example of FIG. 2, the receiving end receives a PDU 8 after receiving a PDU 6. However, serial numbers between the PDU 6 and the PDU 8 are not continuous, and the receiving end can determine that a PDU 7 is lost. That is to say, the receiving end can determine that the PDU 7 has not been received.

7. The receiving end starts the timer and waiting for any PDU of the at least one PDU within the target duration. It means that for each PDU of the at least one PDU, the receiving end waits for a target duration after starting the timer. If a PDU of the at least one PDU is received within the target duration, the PDU is correctly received. If a PDU of the at least one PDU is not received within the target duration, the receiving end may determine that the PDU is lost, and the receiving end may discard other data packets of a SDU related to the PDU.

Therefore, in the method for wireless communication in the embodiments of the present disclosure, the receiving end selects duration of a timer based on a data type of a lost PDU, which is beneficial to improving the flexibility of wireless communication.

Optionally, in embodiments of the present disclosure, the determining, by the receiving end, a target duration of a timer based on a data type of the at least one PDU comprises: determining, by the receiving end, the target duration of the timer from a plurality of preset duration, based on the data type of the at least one PDU.

As mentioned in the second point above, the network device can be pre-configured for a plurality of different duration, and the receiving end can select one of the plurality of duration as a target duration of a timer. If the receiving end is the terminal device and the sending end is the network device, the network device may send a plurality of pre-configured duration to the terminal device, and the terminal device may further select a target duration based on a data type of an unreceived PDU. If the receiving end is the network device and the sending end is the terminal device, the network device does not need to send a plurality of duration after pre-configuring the plurality of duration since the plurality of duration is used to determine, by the network device, a target duration of a timer based on a data type of an unreceived PDU.

Optionally, in embodiments of the present disclosure, the determining, by the receiving end, a target duration of a timer based on a data type of the at least one PDU comprises: determining, by the receiving end, the target duration of the timer from a plurality of preset duration, based on the data type of the at least one PDU.

Optionally, in embodiments of the present disclosure, the method further comprises: determining, by the receiving end, that the at least one PDU comprises a PDU of a first data type and a PDU of a second data type; wherein the determining, by the receiving end, a target duration of a timer based on a data type of the at least one PDU comprises: determining, by the receiving end, duration corresponding to the first data type as the target duration of the timer.

Optionally, the method further comprises: determining, by the receiving end, that a data type of each PDU of the at least one PDU is a second data type; wherein the determining, by the receiving end, a target duration of a timer based on a data type of the at least one PDU comprises: determining, by the receiving end, duration corresponding to the second data type as the target duration of the timer.

Specifically, the receiving end determines that the at least one PDU which is not received comprises PDUs of multiple data types, and the receiving end may use the duration corresponding to one of the data types as duration of a timer of the at least one PDU. For example, if the at least one PDU includes an I frame and a P frame, the receiving end may directly determine duration corresponding to the I frame as the duration of the timer. Or, if the date type of the at least one PDU is a PDU of a same type, then the receiving end may use duration corresponding to the data type as duration of a timer of the at least one PDU.

Optionally, in the embodiments of the present disclosure, when the receiving end determines that there are a plurality of PDUs of different data types between two PDUs, the receiving end may use the longest duration in duration corresponding to data types in the multiple data types as duration of a timer.

Specifically, the network device may configure a corresponding duration for multiple data types in advance. Still taking the above frame type as an example, the network device may configure 100 ms for the I frame, 50 ms for the P frame, and 25 ms for the B frame. Then, when the receiving end (whether it is the network device or the terminal device) has acquired one I frame in the middle of the unreceived PDUs, no matter whether the receiving end has unreceived PDUs of other frame types or not, it may directly set duration of a timer of the at least one unreceived PDU to 100 ms. If the receiving end has acquired that at least one unreceived PDU is PDUs of a same type, the receiving end may directly set the duration of the timer of the at least one unreceived PDU to duration corresponding to the type. For example, when the receiving end has acquired that all the unreceived PDUs are P frames, the receiving end may directly set the duration of the timer of the at least one unreceived PDU to 50 ms.

It should be understood that the above description is all based on the case where the PDUs comprising two data types in at least one unreceived PDU, and the at least one PDU in the embodiments of the present disclosure may also be a PDU of three or more data types. Similarly, the receiving end may use the longest duration in duration corresponding to data types in the three or more data types as duration of a timer of the at least one PDU.

Optionally, in the embodiments of the present disclosure, the first PDU, the second PDU and each PDU of the at least one PDU all carry an indicator field, the indicator field indicates a location of a PDU whose data type is different from that of a present PDU, the PDU whose data type is different from that of a present PDU is a PDU which is sent before the present PDU and whose serial number is the closest to that of the present PDU, and the method further comprises: determining, by the receiving end, the data type of the at least one PDU based on the indicator field carried in the second PDU.

It is understood by those skilled in the art that when a sending end sends a PDU to a receiving end, it usually carries a data type of the PDU. If each PDU also carries a location of the nearest PDU whose data type is different from its own data type, after receiving a PDU which can determine that there is at least one unreceived PDU, the receiving end can determine what the data types of the at least one PDU have based on the indication, which is carried by the PDU, of a location of the nearest PDU whose data type is different from its own data type. For example, if it is determined according to the indication in the PDU that the location of the PDU that is closest to the sequence number and the data type is different from the first PDU and the second PDU, the receiving end may determine the data of the at least one PDU. The type is all the same as the data type of the second PDU, and the duration corresponding to the data type of the second PDU may be determined as the duration of the timer of the at least one PDU. If it is determined based on the indication in the PDU that the location of the PDU, whose sequence number is the closest and whose data type is different, is between the first PDU and the second PDU, the receiving end may determine that the data type of the at least one PDU includes at least the data type of the second PDU and the determined data type which is different from the data type of the second PDU. Then the receiving end may use duration corresponding to the data type of the second PDU or duration corresponding to the data type which is different from the data type of the second PDU as a target duration of a timer of the at least one PDU.

Optionally, the sending end may configure an additional value of the RLC header field in each PDU to be sent, where the field indicates how many PDUs sent before the present PDU includes one PDU different from the data type of the present PDU. When the sending end sends the RLC PDU, the value of the field is included in the RLC PDU. One way is to put it in the RLC header, for example, a byte, indicating the distance from 0 to 255.

Optionally, in the embodiments of the present disclosure, if the receiving end determines that a data type of an unreceived PDU comprises two or more specific data types based on the foregoing manner, the receiving end may determine the longest duration corresponding to a data type of the determined multiple data types as duration of a timer of the unreceived PDU.

Optionally, in the embodiments of the present disclosure, the indicator field may further indicate a location of a PDU whose data type has a higher priority than that of a present PDU and is closest to the present PDU, then the receiving end may directly configure duration of a timer of the at least one PDU as duration corresponding to the data type with higher priority.

The following also describes the case where the data type is a P frame and an I frame. Specifically, as shown in FIG. 4, the receiving end has received PDU 1, 2, 3, 8, and 9. The receiving end determines that PDU 4, PDU 5, PDU 6, and PDU 7 have not been received based on VR (UR) and VR (UX). If the network device is pre-configured as that duration corresponding to the I frame is 100 ms and the duration corresponding to the P frame is 50 ms, the receiving end determines that there is at least one I frame between the VR (UR) and the VR (UX) through the RLC header of the PDU 8, so that the t-Reordering which can be started uses a value of 100 ms. As shown in FIG. 5, PDU 1 and 4 are received, and the receiving end determines that there is no I frame between VR (UR) and VR (UX) through the RLC header of the PDU 4, so that the started t-Reordering uses a value of 50 ms.

Optionally, in the embodiments of the present disclosure, the sending end may inform the receiving end of data types of the multiple PDUs to be sent before sending the PDUs, and when the receiving end determines that at least one PDU is not received, the receiving end may determine the data type of each PDU of the at least one PDU based on comparing a sequence number of the at least one PDU with the data type of the plurality of continuous PDUs sent by the sending end. For example, the sending end may send data types of 10 PDUs to be sent to the receiving end once every 10 PDUs, and then, after the receiving end determines that the PDU4~PDU6 are not received, the data types of PDU4~PDU6 can be determined based on the data types of the 10 PDUs previously sent by the sending end.

Optionally, in the embodiments of the present disclosure, the receiving end is a terminal device, and the method further comprises:

receiving, by the terminal device, the plurality of duration sent by a network device.

Optionally, in the embodiments of the present disclosure, the method further comprises: packaging, by the receiving end, all PDUs in the at least one PDU received within the target duration and updating a reordering window if the timer times out.

The network device mentioned above may configure the terminal device with duration corresponding to multiple data types, and send the plurality of duration to the terminal device. And the network device can indicate to the terminal device a default duration. That is to say, if the technical solutions of the embodiments of the present disclosure are not adopted, the receiving end may use duration selected by the network device as the duration of the timer by default.

It should be understood that the above-mentioned solutions of the receiving end is applicable to both the terminal device and the network device, which is not limited in these embodiments of the present disclosure.

Figure 6:
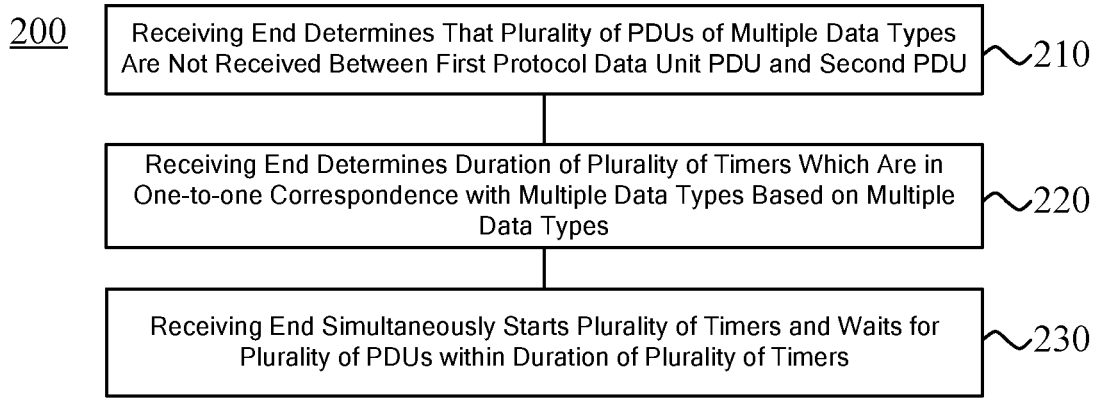
FIG. 6 is another schematic block diagram of a method for wireless communication in an embodiment of the present disclosure.

FIG. 6 is a schematic block diagram of a method for wireless communication 200 in an embodiment of the present disclosure. As shown in FIG. 6, the method 200 includes:

S210, a receiving end determines that a plurality of PDUs of multiple data types are not received between a first protocol data unit PDU and a second PDU;

S220, the receiving end determines duration of a plurality of timers which are in one-to-one correspondence with the multiple data types based on the multiple data types;

S230, the receiving end simultaneously starts the plurality of timers and waits for the plurality of PDUs within the duration of the plurality of timers.

Specifically, when multiple types of PDUs are not received between the first PDU and the second PDU, the receiving end may set timers which are in one-to-one correspondence with the multiple data types. The receiving end may simultaneously start the plurality of timers, and wait for the PDU of the corresponding data type within the duration of each timer.

Similarly, the following describes the case where data types of lost PDUs are an I frame and a P frame. It is assumed that duration of the I frame that is pre-configured by a network device is 100 ms, and duration corresponding to the P frame is 50 ms. The following describes the solutions of the embodiments of the present disclosure in the following cases:

1. The receiving end determines that all lost PDUs between the first PDU and the second PDU are received within 50 ms, and the 50 ms timer and the 100 ms timer can be immediately terminated.

2. The receiving end determines that all the PDUs with a data type of the P frame are received within 50 ms, and the receiving end can immediately terminate the 50 ms timer. The receiving end further determines that all the PDUs with a data type of the I frame are received between 50 ms and 100 ms, then the receiving end can immediately terminate the 100 ms timer.

3. The receiving end determines that all the PDUs with a data type of the I frame are received within 50 ms, and the receiver can immediately terminate the 100 ms timer. If not all the PDUs with a data type of the P frame are received within 50 ms, then the 50 ms timer times out.

4. The receiving end determines that not all the PDUs with a data type of the P frame are received within 50 ms, no PDU with a data type of the P frame is received, and PDUs with a data type of the P frame are received while no PDU with a data type of the P frame is received within 50 ms-100 ms, then the receiving end can consider that both the 50 ms timer and the 100 ms timer are timed out, but the PDUs of the P frame received within 50 ms-100 ms are valid. If the receiving end receives all the PDUs of the I frame within 50 ms-100 ms but does not receive all the PDUs of the P frame, the receiving end immediately stops the 100 ms timer and considers that all PDUs of the P frame received before having received all the PDUs of the I frame are valid.

Therefore, in the method for wireless communication in the embodiments of the present disclosure, the receiving end starts different timers according to different data types, which is beneficial to improving the flexibility of wireless communication.

Optionally, in the embodiments of the present disclosure, the multiple data types comprise a first data type and a second data type, and duration of a timer corresponding to the first data type is greater than duration of a timer corresponding to the second data type, the method further comprises: packaging, by the receiving end, all PDUs in the plurality of PDUs which are received within the duration of the timer corresponding to the first data type and updating a reordering window if the timer corresponding to the first data type times out.

Optionally, in the embodiments of the present disclosure, the multiple data types comprise a first data type and a second data type, and duration of a timer corresponding to the first data type is greater than duration of a timer corresponding to the second data type, the method further comprises: packaging, by the receiving end, all PDUs in the plurality of PDUs which are received within the duration of the timer corresponding to the second data type and updating a reordering window if the timer corresponding to the second data type times out and the receiving end has received all PDUs of the first data type of the plurality of PDUs before the timer corresponding to the second data type times out.

Optionally, in the embodiments of the present disclosure, the multiple data types comprise a first data type and a second data type, and duration of a timer corresponding to the first data type is greater than duration of a timer corresponding to the second data type, the method further comprises: packaging, by the receiving end, all PDUs in the plurality of PDUs which are received before the timer corresponding to the first data type ends and updating a reordering window if the timer corresponding to the second data type times out and the receiving end has received all PDUs of the first data type of the plurality of PDUs before the timer corresponding to the first data type times out.

Optionally, in the embodiments of the present disclosure, the multiple data types comprise a first data type and a second data type, and duration of a timer corresponding to the first data type is greater than duration of a timer corresponding to the second data type, the method further comprises: if the receiving end has received all PDUs in the plurality of PDUs before the timer corresponding to the first data type times out, the receiving end packages the plurality of PDUs, which are received before terminating the timer corresponding to the first data type or before terminating the timer corresponding to the first data type, and updates a reordering window.

Optionally, in the embodiments of the present disclosure, a priority of the first data type is higher than a priority of the second data type.

It should be understood that the above description is only described by taking four possible cases as examples, and the embodiments of the present disclosure is not limited thereto.

Optionally, in the embodiments of the present disclosure, the first PDU, the second PDU and each PDU of the plurality of PDUs all carry an indicator field, the indicator field indicates a location of a PDU whose data type is different from that of a present PDU, the PDU whose data type is different from that of a present PDU is a PDU which is sent before the present PDU and whose serial number is the closest to that of the present PDU, and the method further comprises: determining, by the receiving end, the data type of the plurality of PDUs based on the indicator field carried in the second PDU.

Optionally, in the embodiments of the present disclosure, the multiple data types are at least two types from a type of intraframe, a type of forward prediction frame or a type of bi-directional interpolated prediction frame.

It should be understood that the interaction, related features, functions, and the like between the sending end and the receiving end in the method 200 correspond to the related features and functions of the receiving end in the method 100. For brevity, it will not be covered again herein. For brevity, it will not be covered again herein.

Figure 7:
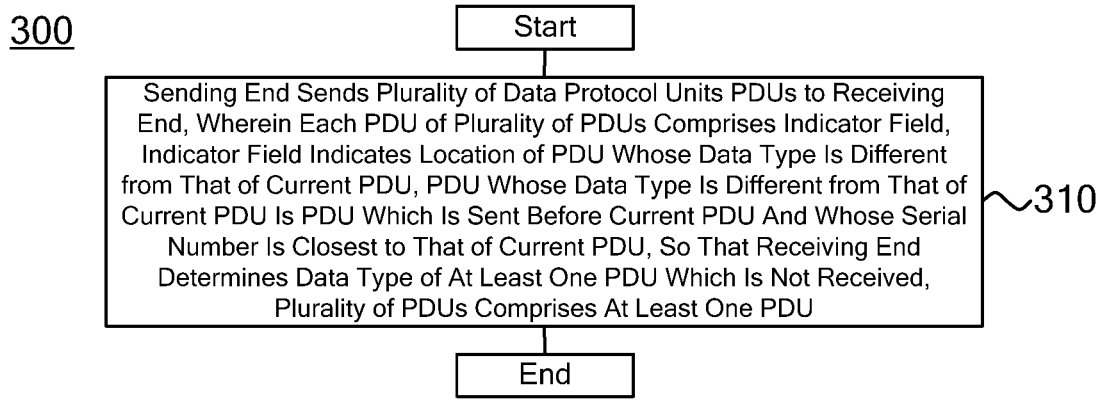
FIG. 7 is another schematic block diagram of a method for wireless communication in an embodiment of the present disclosure.

FIG. 7 is a schematic block diagram of a method for wireless communication 300 in an embodiment of the present disclosure. As shown in FIG. 7, the method 300 includes:

S310, a sending end sends plurality of data protocol units PDUs to a receiving end, each PDU of the plurality of PDUs comprises an indicator field, the indicator field indicates a location of a PDU whose data type is different from that of a present PDU, the PDU whose data type is different from that of a present PDU is a PDU which is sent before the present PDU and whose serial number is the closest to that of the present PDU, so that the receiving end determines a data type of at least one PDU which is not received, the plurality of PDUs comprises the at least one PDU.

Therefore, in the method for wireless communication in the embodiments of the present disclosure, by indicating the receiving end the indicating information used to determine at least one unreceived PDU, so that the receiving end may select different duration of timers according to PDUs of different data types, which is beneficial to improving the flexibility of wireless communication.

Optionally, in the embodiments of the present disclosure, the sending end may further send the data types of the plurality of PDUs to the receiving end before sending the plurality of PDUs, and then the receiving end can determine what the data types of the at least one PDU have after the receiving end has determined that at least one PDU in the plurality of PDUs. Therefore, the receiving end can further determine the duration of the timer of the at least one PDU based on the determined data type.

Optionally, in the embodiments of the present disclosure, the sending end is a network device, the receiving end is a terminal device, the method further comprises: sending, by the network device, a plurality of duration to the terminal device, so that the terminal device determines a target duration of a timer from the plurality of duration based on the data type of the at least one PDU, wherein the target duration of the timer is the longest time of each PDU of the at least one PDU which the terminal device waits for.

Optionally, in the embodiments of the present disclosure, the data types are a type of intraframe, a type of forward prediction frame or a type of bi-directional interpolated prediction frame.

It should be understood that the interaction, related features, functions, and the like between the sending end and the receiving end described in the sending end correspond to the related features and functions of the receiving end. That is to say, what information is sent by the sending end to the receiving end, and what information will be received by the receiving end accordingly. For brevity, it will not be covered again herein.

It should also be understood that, in the embodiments of the present disclosure, the sizes of the serial numbers of the above-mentioned processes do not imply the order of execution, and the order of execution of each process should be determined by its function and internal logic, without any limitation on the implementation process of the embodiments of the present disclosure.

Figure 8:
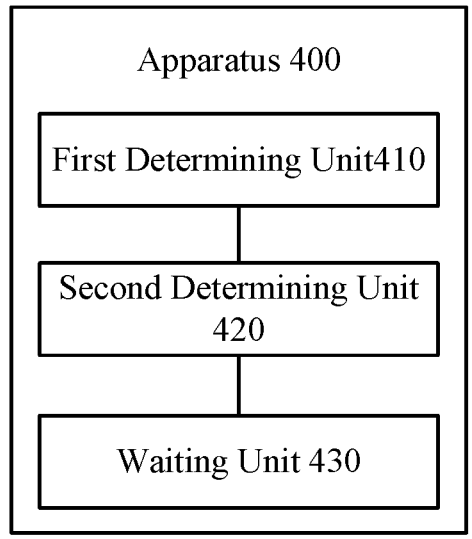
FIG. 8 is a schematic block diagram of an apparatus for wireless communication in an embodiment of the present disclosure.

FIG. 8 is a schematic block diagram of an apparatus 400 for wireless communication in an embodiment of the present disclosure. As shown in FIG. 8, the apparatus 400 includes:

a first determining unit 410, configured to determine that at least one Protocol Data Unit PDU is not received between a first PDU and a second PDU;

a second determining unit 420, configured to determine a target duration of a timer based on a data type of the at least one PDU;

a waiting unit 430, configured to start the timer and wait for the at least one PDU within the target duration.

Therefore, the apparatus for wireless communication in the embodiments of the present disclosure selects duration of a timer based on a data type of a lost PDU, which is beneficial to improving the flexibility of wireless communication.

Optionally, in the embodiments of the present disclosure, the second determining unit is specifically configured to:

determine the target duration of the timer from a plurality of preset duration, based on the data type of the at least one PDU.

Optionally, in the embodiments of the present disclosure, the apparatus further comprises:

a third determining unit, configured to determine that the at least one PDU comprises a PDU of a first data type and a PDU of a second data type;

wherein the second determining unit 420 is specifically configured to:

determine duration corresponding to the first data type as the target duration of the timer.

Optionally, in the embodiments of the present disclosure, the apparatus further comprises:

a third determining unit, configured to determine that the data type of each PDU of the at least one PDU is the second data type;

wherein the second determining unit 420 is specifically configured to:

determine duration corresponding to the second data type as the target duration of the timer.

Optionally, in the embodiments of the present disclosure, a priority of the first data type is higher than that of the second data type, and the duration corresponding to the first data type is greater than the duration corresponding to the second data type.

Optionally, in the embodiments of the present disclosure, the first PDU, the second PDU and each PDU of the at least one PDU all carry an indicator field, the indicator field indicates a location of a PDU whose data type is different from that of a present PDU, the PDU whose data type is different from that of a present PDU is a PDU which is sent before the present PDU and whose serial number is the closest to that of the present PDU, the apparatus further comprises:

a fourth determining unit, configured to determine a data type of the at least one PDU based on the indicator field carried in the second PDU.

Optionally, in the embodiments of the present disclosure, the apparatus is a terminal device, the apparatus 400 further comprises:

a receiving unit, configured to receive the plurality of duration sent by a network device.

Optionally, in the embodiments of the present disclosure, the data types are a type of intraframe, a type of forward prediction frame or a type of bi-directional interpolated prediction frame.

Optionally, in the embodiments of the present disclosure, the apparatus 400 further comprises: a processing unit, configured to package the at least one PDU received within the target duration and updating a reordering window if the timer times out.

It should be understood that the apparatus 400 for wireless communication according to the embodiments of the present disclosure may correspond to the receiving end in the embodiments of the method of the present disclosure, and the foregoing and other operations and/or functions of each unit in the apparatus 400 are to respectively implement corresponding processes of the receiving end in the method 100 shown in FIG. 3 to FIG. 5. For brevity, it will not be covered again herein.

Figure 9:
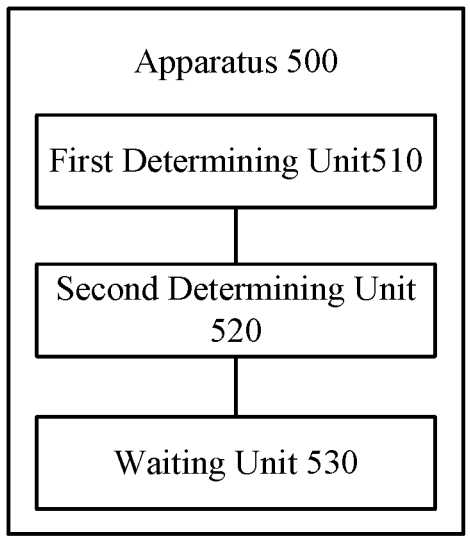
FIG. 9 is another schematic block diagram of an apparatus for wireless communication in an embodiment of the present disclosure.

FIG. 9 is a schematic block diagram of an apparatus 500 for wireless communication in an embodiment of the present disclosure. As shown in FIG. 9, the apparatus 500 includes:

a first determining unit 510, configured to determine that a plurality of Protocol Data Unit PDUs of multiple date types are not received between a first PDU and a second PDU;

a second determining unit 520, configured to determine duration of a plurality of timers which are in one-to-one correspondence with the multiple data types based on the multiple data types;

a waiting unit 530, configured to start simultaneously the plurality of timers and wait for the plurality of PDUs within the duration of the plurality of timers.

Optionally, in the embodiments of the present disclosure, the multiple data types comprise a first data type and a second data type, and duration of a timer corresponding to the first data type is greater than duration of a timer corresponding to the second data type, the apparatus further comprises: a processing unit, configured to package all PDUs in the plurality of PDUs which are received within the duration of the timer corresponding to the first data type and update a reordering window if the timer corresponding to the first data type times out.

Optionally, in the embodiments of the present disclosure, the processing unit is further configured to: package all PDUs in the plurality of PDUs which are received within the duration of the timer corresponding to the second data type and update a reordering window if the timer corresponding to the second data type times out and the apparatus has received all PDUs of the first data type of the plurality of PDUs before the timer corresponding to the second data type times out.

Optionally, in the embodiments of the present disclosure, the processing unit is further configured to: package all PDUs in the plurality of PDUs which are received before the timer corresponding to the first data type ends and update a reordering window if the timer corresponding to the second data type times out and the apparatus has received all PDUs of the first data type of the plurality of PDUs before the timer corresponding to the first data type times out.

Optionally, in the embodiments of the present disclosure, a priority of the first data type is higher than a priority of the second data type.

Optionally, in the embodiments of the present disclosure, the first PDU, the second PDU and each PDU of the plurality of PDUs all carry an indicator field, the indicator field indicates a location of a PDU whose data type is different from that of a present PDU, the PDU whose data type is different from that of a present PDU is a PDU which is sent before the present PDU and whose serial number is the closest to that of the present PDU, and the apparatus 500 further comprises: a third determining unit, configured to determine the data type of the plurality of PDUs based on the indicator field carried in the second PDU.

Optionally, in the embodiments of the present disclosure, the data types are two types from a type of intraframe, a type of forward prediction frame or a type of bi-directional interpolated prediction frame.

It should be understood that the apparatus 500 for wireless communication according to the embodiments of the present disclosure may correspond to the sending end in the embodiments of the method of the present disclosure, and the foregoing and other operations and/or functions of each unit in the apparatus 500 are to respectively implement corresponding processes of the receiving end in the method 200 shown in FIG. 6. For brevity, it will not be covered again herein.

Figure 10:
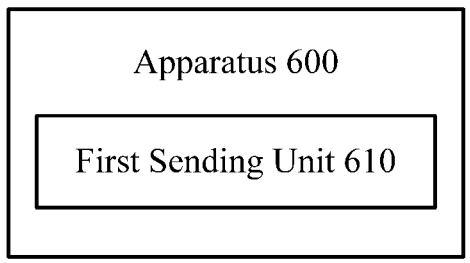
FIG. 10 is another schematic block diagram of an apparatus for wireless communication in an embodiment of the present disclosure.

FIG. 10 is a schematic block diagram of an apparatus 600 for wireless communication in an embodiment of the present disclosure. As shown in FIG. 10, the apparatus 600 includes:

a first sending unit 610, configured to send a plurality of protocol data units PDUs to a receiving end, wherein each PDU of the plurality of PDUs comprises an indicator field, wherein the indicator field indicates a location of a PDU whose data type is different from that of a present PDU, wherein the PDU whose data type is different from that of a present PDU is a PDU which is sent before the present PDU and whose serial number is the closest to that of the present PDU, so that the receiving end determines a data type of at least one PDU which is not received, wherein the plurality of PDUs comprises the at least one PDU.

Therefore, in the apparatus for wireless communication in the embodiments of the present disclosure, by indicating the receiving end the indicating information used to determine at least one unreceived PDU, so that the receiving end may select different duration of timers according to PDUs of different data types, which is beneficial to improving the flexibility of wireless communication.

Optionally, in the embodiments of the present disclosure, the apparatus is a network device, the receiving end is a terminal device, the apparatus 600 further comprises:

a second sending unit, configured to send a plurality of duration to the terminal device, so that the terminal device determines a target duration of a timer from the plurality of duration based on the data type of the at least one PDU, wherein the target duration of the timer is the longest time of each PDU of the at least one PDU which the terminal device waits for.

Optionally, in the embodiments of the present disclosure, the data types are a type of intraframe, a type of forward prediction frame or a type of bi-directional interpolated prediction frame.

It should be understood that the apparatus 600 for wireless communication according to the embodiments of the present disclosure may correspond to the sending end in the embodiments of the method of the present disclosure, and the foregoing and other operations and/or functions of each unit in the apparatus 600 are to respectively implement corresponding processes of the receiving end in the method 300 shown in FIG. 7. For brevity, it will not be covered again herein.

Figure 11:
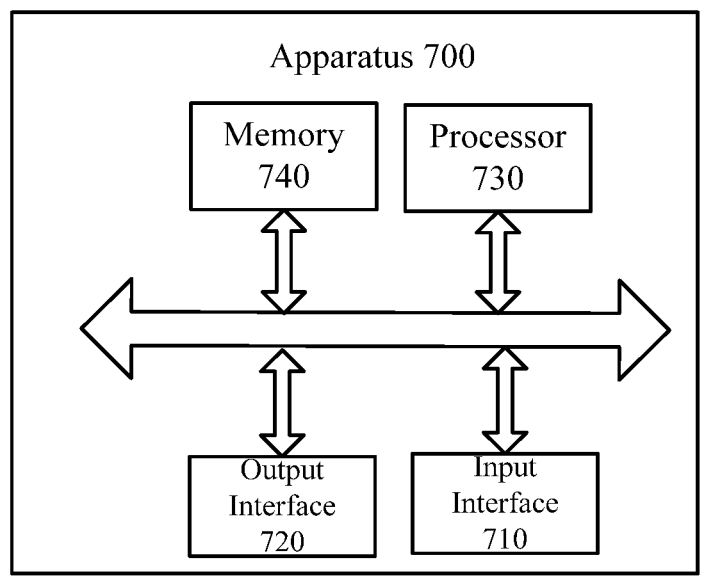
FIG. 11 is another schematic block diagram of an apparatus for wireless communication in an embodiment of the present disclosure.

As shown in FIG. 11, the embodiments of the present disclosure also provide an apparatus 700 for wireless communication, wherein the apparatus 700 may be the apparatus 400 in FIG. 8, which can be used to perform the content of the receiving end corresponding to the method 100 in FIG. 3. The apparatus 700 includes: an input interface 710, an output interface 720, a processor 730 and a memory 740, wherein the input interface 710, the output interface 720, the processor 730 and the memory 740 can be connected to a bus system. The memory 740 is configured to store programs, instructions or codes. The processor 730 is configured to execute programs, instructions or codes in the memory 740 to control the input interface 710 to receive signals, to control the output interface 720 to transmit signals, and to complete the operations in the embodiments of the method described above.

Therefore, the apparatus for wireless communication in the embodiments of the present disclosure selects duration of a timer based on a data type of a lost PDU, which is beneficial to improving the flexibility of wireless communication.

It should be understood that in the embodiments of the present disclosure, the processor 730 may be a Central Processing Unit (CPU). The processor 730 may also be another general-purpose processor, a Digital Signal Processor, an Application Specific Integrated Circuit, a Field Programmable Gate Array or other programmable logic device, discrete gate or transistor logic device, discrete hardware component and etc. A general-purpose processor can be a microprocessor or the processor can be any conventional processor.

The memory 740 may include a read-only memory and a random access memory, and provide instructions and data to the processor 730. A portion of the memory 740 may also include a nonvolatile random access memory. For example, the memory 740 may also store information about device types.

In the process of implementation, the content of the above method can be implemented by integrated logic circuit of hardware in the processor 730 or instructions in the form of software. The content with reference to the method disclosed in the embodiments of the present disclosure may be directly implemented to be performed by a hardware processor, or may be performed by a combination of hardware and software modules in the processor. Software modules can be located in a developed storage medium in this field, such as a random access memory, a flash memory, a read-only memory, a programmable read-only memory or an electrical erasable programmable memory, a register. The storage medium is located in the memory 740, and the processor 730 reads the information in the memory 740 and completes the content of the above method with its hardware. To avoid repetition, it will not be described in detail herein.

In a specific implementation, the first determining unit 410, the second determining unit 420, the waiting unit 430, the third determining unit, the fourth determining unit and the reordering unit in the apparatus 400 may be processed by the processor 730 in FIG. 11. The receiving unit in the apparatus 400 may be implemented by the input interface 710 in FIG. 11.

Figure 12:
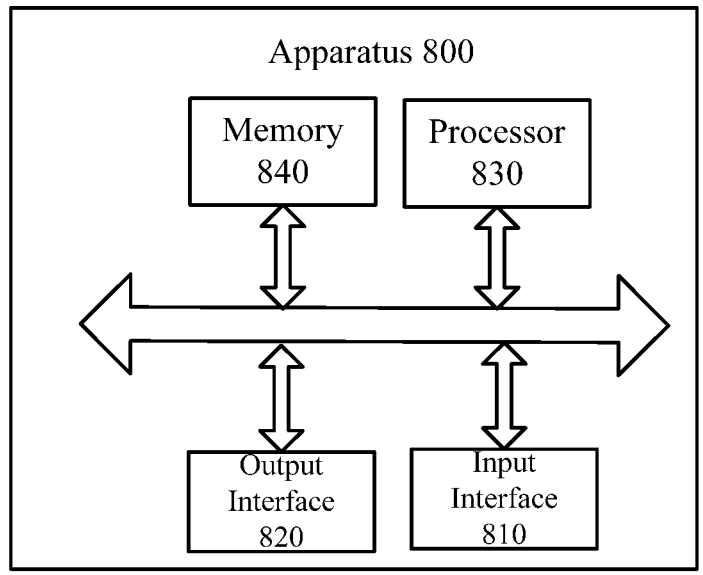
FIG. 12 is another schematic block diagram of an apparatus for wireless communication in an embodiment of the present disclosure.

As shown in FIG. 12, the embodiments of the present disclosure also provide an apparatus 800 for wireless communication, wherein the apparatus 800 may be the apparatus 500 in FIG. 9, which can be used to perform the content of the sending end corresponding to the method 200 in FIG. 6. The apparatus 800 includes: an input interface 810, an output interface 820, a processor 830 and a memory 840, wherein the input interface 810, the output interface 820, the processor 830 and the memory 840 can be connected to a bus system. The memory 840 is configured to store programs, instructions or codes. The processor 830 is configured to execute programs, instructions or codes in the memory 840 to control the input interface 810 to receive signals, to control the output interface 820 to transmit signals, and to complete the operations in the embodiments of the method described above.

Therefore, the apparatus for wireless communication in the embodiments of the present disclosure selects different duration of timers for PDUs of different data types, which is beneficial to improving the flexibility of wireless communication.

It should be understood that in the embodiments of the present disclosure, the processor 830 may be a Central Processing Unit (CPU). The processor 830 may also be another general-purpose processor, a Digital Signal Processor, an Disclosure Specific Integrated Circuit, a Field Programmable Gate Array or other programmable logic device, discrete gate or transistor logic device, discrete hardware component and etc. A general-purpose processor can be a microprocessor or the processor can be any conventional processor.

The memory 840 may include a read-only memory and a random access memory, and provide instructions and data to the processor 830. A portion of the memory 840 may also include a nonvolatile random access memory. For example, the memory 840 may also store information about device types.

In the process of implementation, the content of the above method can be implemented by integrated logic circuit of hardware in the processor 830 or instructions in the form of software. The content with reference to the method disclosed in the embodiments of the present disclosure may be directly implemented to be performed by a hardware processor, or may be performed by a combination of hardware and software modules in the processor. Software modules can be located in a developed storage medium in this field, such as a random access memory, a flash memory, a read-only memory, a programmable read-only memory or an electrical erasable programmable memory, a register. The storage medium is located in the memory 840, and the processor 830 reads the information in the memory 840 and completes the content of the above method with its hardware. To avoid repetition, it will not be described in detail herein.

In a specific implementation, the first determining unit 510, the second determining unit 520, the waiting unit 530, the reordering unit and the third determining unit in the apparatus 500 may be implemented by the output interface 820 in FIG. 12.

Figure 13:
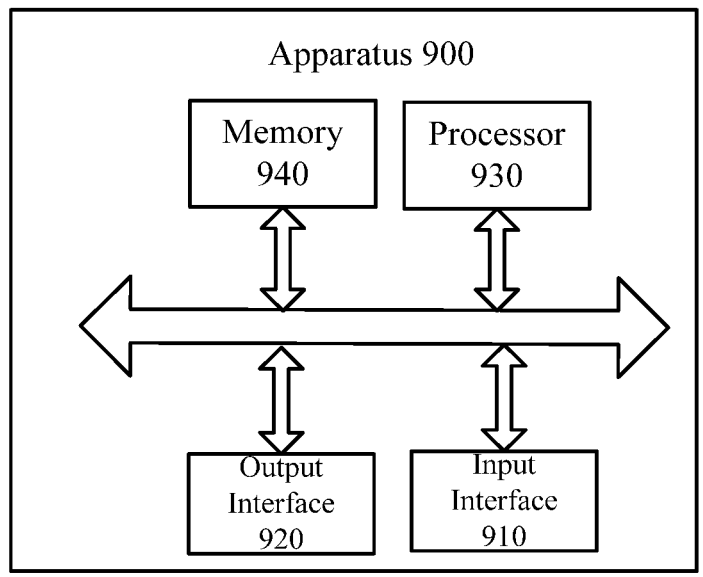
FIG. 13 is another schematic block diagram of an apparatus for wireless communication in an embodiment of the present disclosure.

As shown in FIG. 13, the embodiments of the present disclosure also provide an apparatus 900 for wireless communication, wherein the apparatus 800 may be the apparatus 600 in FIG. 10, which can be used to perform the content of the sending end corresponding to the method 300 in FIG. 7. The apparatus 900 includes: an input interface 910, an output interface 920, a processor 930 and a memory 940, wherein the input interface 910, the output interface 920, the processor 930 and the memory 940 can be connected to a bus system. The memory 940 is configured to store programs, instructions or codes. The processor 930 is configured to execute programs, instructions or codes in the memory 940 to control the input interface 910 to receive signals, to control the output interface 920 to transmit signals, and to complete the operations in the embodiments of the method described above.

Therefore, in the apparatus for wireless communication in the embodiments of the present disclosure, by indicating the receiving end the indicating information used to determine at least one unreceived PDU, so that the receiving end may select different duration of timers according to PDUs of different data types, which is beneficial to improving the flexibility of wireless communication.

It should be understood that in the embodiments of the present disclosure, the processor 930 may be a Central Processing Unit (CPU). The processor 930 may also be another general-purpose processor, a Digital Signal Processor, an Disclosure Specific Integrated Circuit, a Field Programmable Gate Array or other programmable logic device, discrete gate or transistor logic device, discrete hardware component and etc. A general-purpose processor can be a microprocessor or the processor can be any conventional processor.

The memory 940 may include a read-only memory and a random access memory, and provide instructions and data to the processor 930. A portion of the memory 940 may also include a nonvolatile random access memory. For example, the memory 940 may also store information about device types.

In the process of implementation, the content of the above method can be implemented by integrated logic circuit of hardware in the processor 930 or instructions in the form of software. The content with reference to the method disclosed in the embodiments of the present disclosure may be directly implemented to be performed by a hardware processor, or may be performed by a combination of hardware and software modules in the processor. Software modules can be located in a developed storage medium in this field, such as a random access memory, a flash memory, a read-only memory, a programmable read-only memory or an electrical erasable programmable memory, a register. The storage medium is located in the memory 940, and the processor 930 reads the information in the memory 940 and completes the content of the above method with its hardware. To avoid repetition, it will not be described in detail herein.

In a specific implementation, the first sending unit 610 and the second sending unit in the apparatus 600 can be implemented by the output interface 920 in FIG. 13.

The embodiments of the present disclosure further provide a computer readable storage medium storing one or more programs, wherein the one or more programs includes instructions. When the instructions is executed by a portable electronic device which includes a plurality of applications, the portable electronic device can be caused to perform the methods of the embodiments shown in FIG. 3, FIG. 6 or FIG. 7.

The embodiments of the present disclosure also propose a computer program comprising instructions. When the computer program is executed by a computer, the computer can be caused to execute corresponding processes of the methods of the embodiments shown in FIG. 3, FIG. 6 or FIG. 7.

It may be realized by an ordinary person skilled in the art that various units and algorithm steps of various embodiments described in conjunction with the embodiments disclosed herein may be implemented in electronic hardware, or a combination of electronic hardware and computer software. Whether these functions are implemented in hardware or software depends on specific applications and design constraints of technical solutions. A person skilled in the art may implement the described functions with different methods for each of specific applications, but such implementations shall not be regarded as going beyond the scope of the present disclosure.

A person skilled in the art may clearly understand that for the sake of convenience and conciseness in description, corresponding processes in the forgoing method embodiments can be referenced for the specific work processes of the systems, devices and units described in the above, which are not further described herein.

In several embodiments provided by the present disclosure, it should be understood that the disclosed systems, devices and methods may be implemented by other means. For example, the device embodiments described above are merely schematic. For example, the partitioning of the units is merely a partitioning in logical function. There may be other manners for partitioning in actual implementation. For example, multiple units or components may be combined together or integrated into another system, or some features can be omitted or not be executed. In addition, mutual couplings or direct couplings or communication connections that are shown or discussed may be indirect couplings or communication connections through some interfaces, devices or units, and may be in electrical, mechanical or other forms.

The units described as separated components may be or may not be physically separated. The components shown as units may be or may not be physical units, that is, they may be located in one place or may be distributed on a plurality of network units. Part or all of the units may be selected according to actual requires to achieve the purposes of the solutions of the embodiments of the present disclosure.

In addition, each functional unit in each embodiment of the present disclosure may be integrated into one processing unit, or each unit exists independently in physics, or two or more units may be integrated into one unit.

The functions, if implemented in the form of software functional units and sold or used as a standalone product, may be stored in a computer-readable storage medium. Based on such an understanding, the technical solution of the present disclosure in essence, or the part that contributes to the prior art, or all or part of the technical solution, may be embodied in the form of a software product. The computer software product is stored in a storage medium and includes a plurality of instructions for a computer device (which may be a personal computer, a server, a network device or the like) to execute all or part of the steps of the method described in the embodiments of the present disclosure. The foregoing storage medium includes various media that may store program code, such as a USB flash disk, a mobile hard disk, a Read-Only Memory (ROM), a Random Access Memory (RAM), a magnetic disk, an optical disk.

The above description is merely a specific implementation mode of the present disclosure, but the scope of protection of the present disclosure is not limited to this. Any modification or replacement that would be readily conceived by any person skilled in the art within the scope of the technology disclosed in the present disclosure should be within the scope of protection of the present disclosure. Therefore, the scope of protection of the present disclosure shall be defined by the claims.

What is claimed is:

1. A method for wireless communication, comprising:
   determining, by a receiving end, that at least one Protocol Data Unit (PDU) is not received between a first PDU and a second PDU;
   determining, by the receiving end, a target duration of a timer based on a data type of the at least one PDU;
   starting, by the receiving end, the timer and waiting for each PDU of the at least one PDU within the target duration,
   wherein the first PDU, the second PDU and each PDU of the at least one PDU all carry an indicator field, wherein the indicator field indicates a distance between the PDU of a first data type and a PDU of a second data type different from the first data type, sent before the PDU of the first data type and having a serial number closest to the PDU of the first data type, the method further comprising:
   determining, by the receiving end, the data type of the at least one PDU based on a number of the at least one PDU and the distance indicated by the indicator field carried in the second PDU;
   determining, in response to determining that the distance is greater than the number, the data type of the at least one PDU is same as the second PDU; and
   determining, in response to determining that the distance is smaller than or equal to the number, a data type of one of the at least one PDU is different from the second PDU;
   wherein the first data type is one of I frame and P frame, and the second data type is another one of I frame and P frame.

2. The method according to claim 1, wherein determining, by the receiving end, a target duration of a timer based on a data type of the at least one PDU comprises:
   determining, by the receiving end, the target duration of the timer from a plurality of preset duration, based on the data type of the at least one PDU.

3. The method according to claim 2, wherein receiving end is a terminal device, the method further comprising:
   receiving, by the terminal device, the plurality of preset duration sent by a network device.

4. The method according to claim 1,
   wherein determining, by the receiving end, a target duration of a timer based on a data type of the at least one PDU comprises:
   determining, by the receiving end, duration corresponding to the first data type as the target duration of the timer.

5. The method according to claim 4, wherein a priority of the first data type is higher than that of the second data type, and wherein the duration corresponding to the first data type is greater than the duration corresponding to the second data type.

6. The method according to claim 1, further comprising:
   determining, by the receiving end, that a data type of each PDU of the at least one PDU is the second data type;
   wherein determining, by the receiving end, a target duration of a timer based on a data type of the at least one PDU comprises:
   determining, by the receiving end, duration corresponding to the second data type as the target duration of the timer.

7. The method according to claim 1, wherein the data type is at least one type from a type of intraframe, a type of forward prediction frame and a type of bi-directional interpolated prediction frame.

8. The method according to claim 1, further comprising:
   packaging, by the receiving end, all PDUs in the at least one PDU received within the target duration and updating a reordering window if the timer times out.

9. An apparatus for wireless communication, comprises a memory, a processor, an input interface and an output interface, wherein the memory, the processor, the input interface and the output interface are connected to a bus system, the memory is used to store instructions, and the processor is used to execute instructions stored in the memory, so as to perform a method for wireless communication, comprising:
   determining that at least one Protocol Data Unit PDU is not received between a first PDU and a second PDU;
   determining a target duration of a timer based on a data type of the at least one PDU;
   starting the timer and waiting for each PDU of the at least one PDU within the target duration,
   wherein the first PDU, the second PDU and each PDU of the at least one PDU all carry an indicator field, wherein the indicator field indicates a distance between the PDU of a first data type and a PDU of a second data type different from the first data type, sent before the PDU of the first data type and having a serial number closest to the PDU of the first data type, the method further comprising:

determining, by the receiving end, the data type of the at least one PDU based on a number of the at least one PDU and the distance indicated by the indicator field carried in the second PDU;

determining, in response to determining that the distance is greater than the number, the data type of the at least one PDU is same as the second PDU; and determining, in response to determining that the distance is smaller than or equal to the number, a data type of one of the at least one PDU is different from the second PDU;

wherein the first data type is one of I frame and P frame, and the second data type is another one of I frame and P frame.

10. The apparatus according to claim 9, wherein determining, a target duration of a timer based on a data type of the at least one PDU comprises:

determining the target duration of the timer from a plurality of preset duration, based on the data type of the at least one PDU.

11. The apparatus according to claim 10, wherein the apparatus is a terminal device, the method further comprises:

receiving the plurality of preset duration sent by a network device.

12. The apparatus according to claim 9, wherein determining a target duration of a timer based on a data type of the at least one PDU comprises:

determining duration corresponding to the first data type as the target duration of the timer.

13. The apparatus according to claim 12, wherein a priority of the first data type is higher than that of the second data type, and wherein the duration corresponding to the first data type is greater than the duration corresponding to the second data type.

14. The apparatus according to claim 9, wherein the method further comprises:

determining that the data type of each PDU of the at least one PDU is the second data type;

wherein determining a target duration of a timer based on a data type of the at least one PDU comprises:

determining duration corresponding to the second data type as the target duration of the timer.

15. The apparatus according to claim 9, the method further comprises:

packaging all PDUs in the at least one PDU received within the target duration and updating a reordering window if the timer times out.

* * * * *